United States Patent [19]

Yokoe et al.

[11] Patent Number: 5,029,539

[45] Date of Patent: Jul. 9, 1991

[54] STITCH PATTERN FORMATION SEWING MACHINE

[75] Inventors: Masaaki Yokoe, Nagoya; Yoshikazu Kurono, Hazu, both of Japan

[73] Assignee: Brother Kogyo Kabushiki Kaisha, Nagoya, Japan

[21] Appl. No.: 557,801

[22] Filed: Jul. 26, 1990

[30] Foreign Application Priority Data

Aug. 17, 1989 [JP] Japan .................. 1-211922

[51] Int. Cl.$^5$ .................................. D05B 21/00
[52] U.S. Cl. ...................... 112/121.12; 112/454; 112/277; 112/273
[58] Field of Search ............. 112/121.12, 103, 454, 112/121.11, 266.1, 262.3, 273, 278, 275, 277

[56] References Cited

U.S. PATENT DOCUMENTS

| | | | |
|---|---|---|---|
| 4,413,574 | 11/1983 | Hirota et al. | 112/121.12 |
| 4,557,207 | 12/1985 | Turner et al. | 112/454 X |
| 4,823,714 | 4/1989 | Yokoe et al. | 112/103 X |
| 4,932,342 | 6/1990 | Hisataka et al. | 112/103 |
| 4,936,233 | 6/1990 | Tajima | 112/103 |

FOREIGN PATENT DOCUMENTS 2208325A 3/1989 United Kingdom .

Primary Examiner—Peter Nerbun
Attorney, Agent, or Firm—Oliff & Berridge

[57] ABSTRACT

A sewing machine for forming stitch patterns on a fabric comprising a select key, an input key, a cessation signal generator, and a controller. Stitch pattern data for desired stitch patterns are chosen from a large number of stitch pattern data stored in a memory by the select key, and arrangement data, comprising arrangement direction data, arrangement number data, and margin space data, for the stitch patterns are entered via the input key. The sewing machine forms arranged stitch patterns on a fabric by relative movement between a needle and a fabric holder. When some accident, such as thread breakage and needle breakage, occurs, during the stitch pattern formation, the signal generator issues a cessation signal and the controller stops the sewing machine in response to the cessation signal. The controller further recommences the sewing machine in accordance with the arrangement data of the stitch patterns and the stitch pattern data for the next stitch pattern. Since the uncompleted stitch pattern is not formed again after the cause of the accident is removed, the sewing machine can effectively form stitch patterns, especially when repeatedly forming a single stitch pattern or a single combination of stitch patterns.

22 Claims, 7 Drawing Sheets

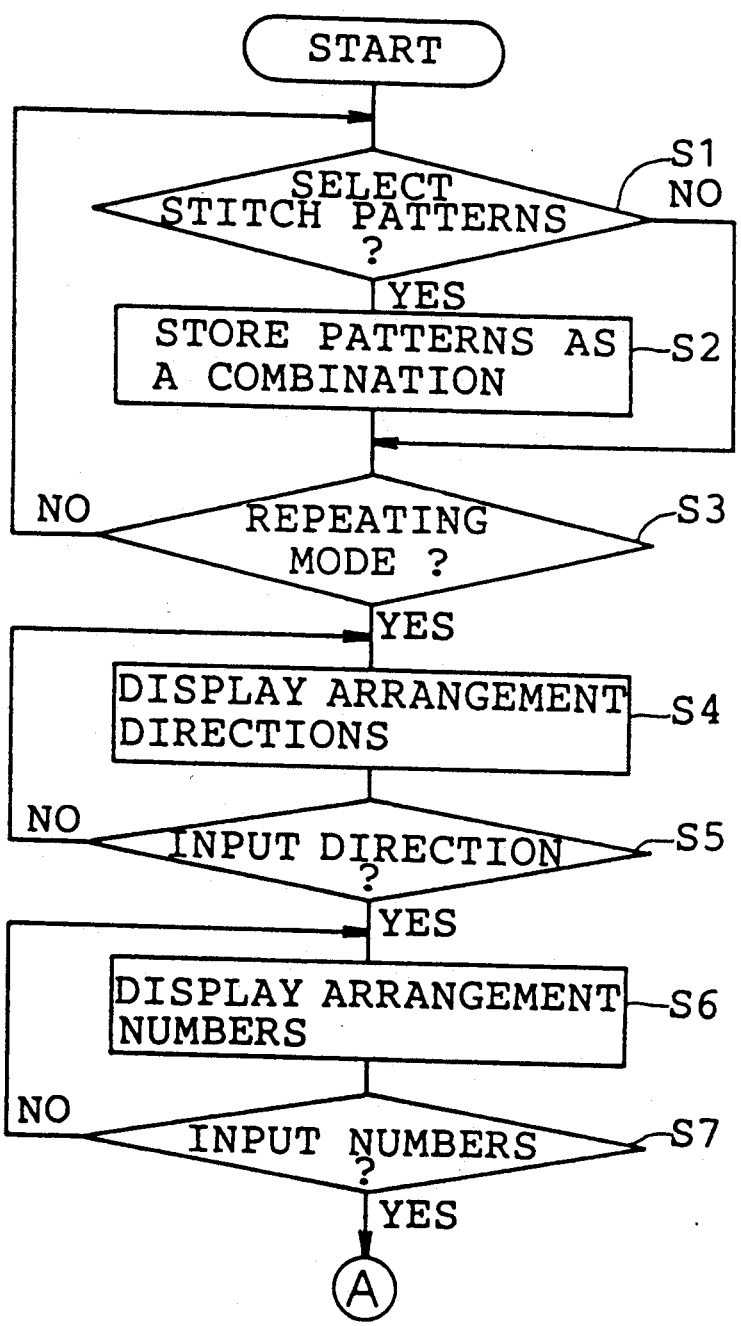

ARRANGEMENT DIRECTION

1. VERTICAL ARRANGEMENT  2. LATERAL ARRANGEMENT  3. OBLIQUE ARRANGEMENT 1.  2.  3.

ARRANGEMENT NUMBER

LATERAL (X-)DIRECTION : VERTICAL (Y-)DIRECTION

3 × 2

| 1 | 2 | 3 | 4 | 5 | 6 |   |   |   |   |

MARGIN SPACE

LATERAL SPACE (Mx) : VERTICAL SPACE (My)

0 1 0  m/m    0 2 0  m/m

STITCH PATTERN FORMATION SEWING MACHINE

BACKGROUND OF THE INVENTION

This invention relates to a stitch pattern formation sewing machine for forming arranged combinations of stitch patterns on a fabric by relative movement between a vertically movable needle and a fabric holding means for holding the fabric in accordance with stitch pattern data selected by a select means and arrangement data input by an input means.

When stitch patterns for an insignia or a set of initials are repeatedly sewn with a conventional sewing machine, stitch pattern data stored in a memory means, for example, "a", "b" and "c", are selected on a keyboard and combined and arrangement data is input. The arrangement data comprises direction data for arranging the combination of the stitch patterns in a desired direction and interval data for arranging each of the combinations at appropriate intervals. According to the stitch pattern data and the arrangement data for stitch patterns "a", "b", and "c", a needle is vertically driven and a fabric is moved by a fabric holding means relative to the needle. The combination of the three stitch patterns "a", "b", and "c" is thus formed on the fabric.

In the above conventional sewing machine, when a thread is broken while the stitch pattern "b" is being formed after the stitch pattern "a" has been sewn, the sewing machine is automatically stopped and the fabric is moved back to the beginning point for the stitch pattern "b". Then, the formed portion of the stitch pattern "b" is removed and the needle is threaded. Subsequently, the sewing machine resumes sewing the stitch patterns "b" and "c". When the second combination "abc" is sewn at a specified distance away from the first combination, the position of the fabric relative to the needle is changed by a jog key after the first combination is formed.

Therefore, when a thread breakage happens while multiple combinations of stitch patterns are being sewn, the removal of the stitches of uncompleted stitch patterns is very tedious and time-consuming operation, thus decreasing labor effectiveness.

In addition, in the sewing machine frequent operation of the jog key and a start key is necessary to form the same stitch patterns repeatedly. The tedious operation of the jog key and the start key also decreases the labor effectiveness.

SUMMARY OF THE INVENTION

An object of the present invention is to provide a sewing machine in which a formed portion of a stitch pattern is not removed and the previously formed portion of the stitch pattern is not formed again after the sewing machine is stopped due to a thread breakage or other causes, and therefore high labor effectiveness is expected, especially when the same stitch patterns are repeatedly sewn.

This object is achieved by the present invention, which provides a stitch pattern formation sewing machine that comprises a select means for selecting stitch pattern data for several stitch patterns from a large number of stitch pattern data stored in a memory means and an input means for entering arrangement data for the stitch patterns and which forms the stitch patterns on a fabric by driving a fabric holding means for holding the fabric relative to a needle according to the stitch pattern data selected by the select means and the arrangement data input by the input means. The sewing machine further comprises a signal generating means for issuing a cessation signal during the operation of the sewing machine and a control means for stopping the sewing machine in response to the cessation signal and for recommencing the stitch pattern forming operation for the next stitch pattern according to the arrangement data and the stitch pattern data for the next stitch pattern.

Another object of the present invention is to provide a stitch pattern formation sewing machine that is provided with a stitch pattern select means by which the same stitch patterns may be repeatedly formed without frequent operation of a jog key and a start key thus improving labor efficiency.

This object is achieved by the present invention, which provides a stitch formation sewing machine that comprises stitch pattern memory means for storing a plurality of stitch pattern data representing stitch patterns, arrangement memory means for storing a plurality of arrangement data, where each arrangement number comprises direction data and margin space data representing an arrangement of stitch patterns to be formed on the fabric, first selecting means for selecting a desired stitch pattern data from among the plurality of stitch pattern data stored in the stitch pattern memory means, second selecting means for selecting a desired arrangement data from among the plurality of arrangement data stored in the arrangement memory means, stitching means for forming stitch patterns on the fabric, and first control means for controlling the stitching means to form a plurality of stitch patterns on the fabric according to the desired stitch pattern data and in an arrangement dictated by the desired arrangement data.

BRIEF DESCRIPTION OF THE DRAWINGS

By way of example and to make the description clear, reference is made to accompanying drawings in which:

FIG. 3 illustrates a content of a work memory;

FIGS. 4A through 4C are flow charts for forming combinations of stitch patterns with the sewing machine;

DETAILED DESCRIPTION OF THE PREFERRED EMBODIMENT

An embodiment for the present invention will be explained in detail with reference to the drawings.

Figure 2:
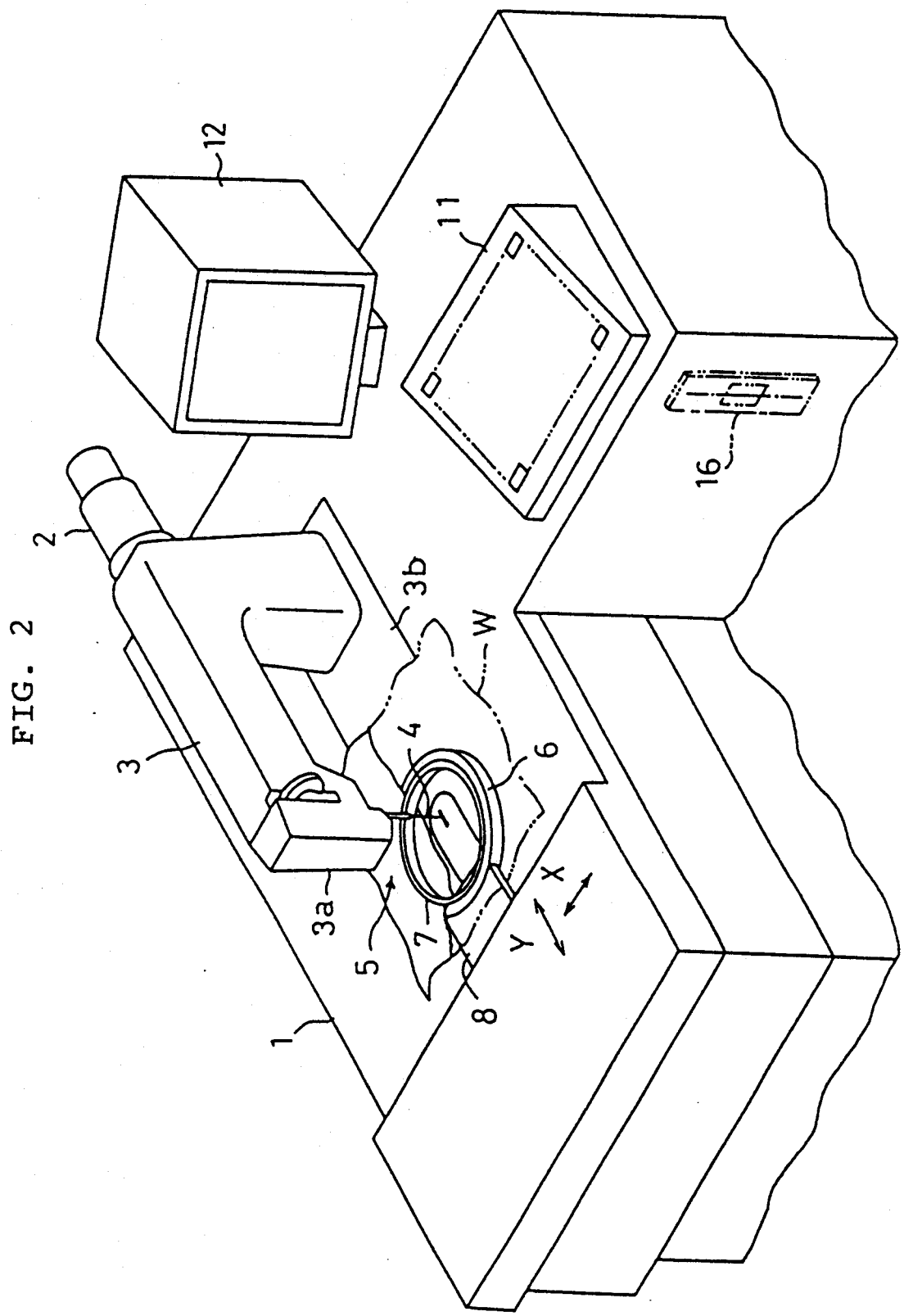
FIG. 2 is a perspective view of the sewing machine.

As shown in FIG. 2, a body 3 of a sewing machine with a motor 2 is provided on a table 1. A stitch formation device 5 comprises a needle 4 attached to an arm 3a so as to move vertically and a loop taker (not shown) provided in a bed 3b. On the table 1 a holding frame 6 is installed to move in an X-direction and a Y-direction. A fabric W is stretched and placed under the needle 4 when a pressing frame 7 is inserted in the holding frame 6 with the fabric interposed between. The holding frame 6 and the pressing frame 7, which compose a fabric holding means, are moved in the X-direction and the Y-direction with respect to the needle 4 by means of a feed device 8. The feed device 8 comprises an X/Y-direction drive motor and other components. Stitch patterns such as characters and diagrams are thus sewn on the fabric W.

A keyboard 11 and a display unit 12 are also provided on the table 1. The keyboard 11 functions as a select means and an input means. A plurality of keys are arranged on the keyboard, such as a select key for selecting stitch pattern data corresponding to a variety of stitch patterns, a start key for starting formation of stitch patterns, a cancel key for canceling an uncompleted stitch pattern during the stitch formation and for instructing the sewing machine to begin formation of the next stitch pattern, and a mode setting key for setting a repeating mode in which combinations of stitch patterns are formed repeatedly. The display unit 12 displays selected stitch patterns, a direction, and numbers of arranged combinations of the stitch patterns to be repeatedly formed.

Figure 1:
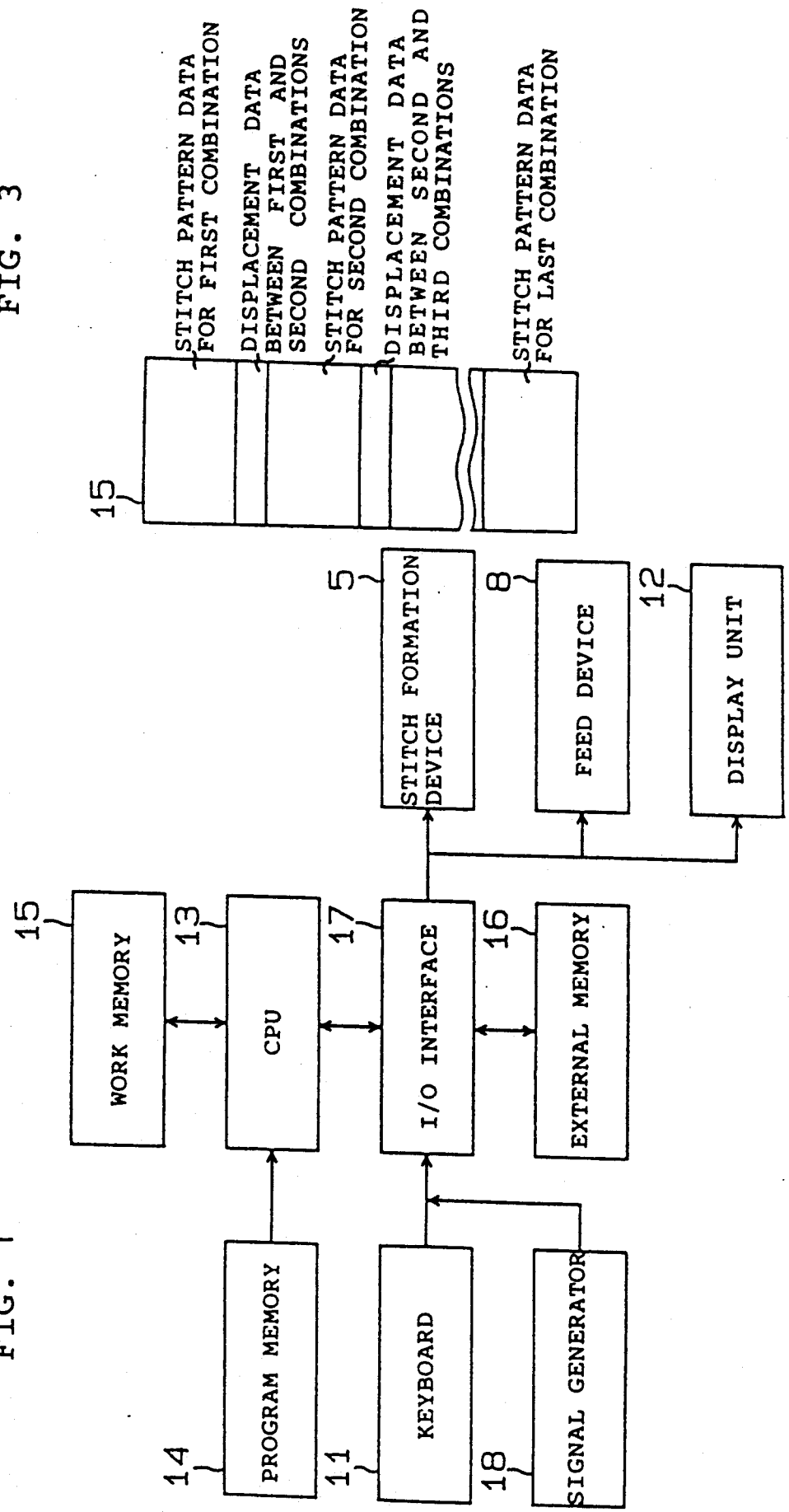
FIG. 1 is a block diagram for a control unit of a stitch pattern formation sewing machine embodying the present invention.

As shown in FIG. 1, a central processing unit (hereinafter referred to as CPU) 13 as a control means is provided with a program memory 14 containing a read only memory (hereinafter referred to as ROM) for controlling the operation of the sewing machine and a work memory 15 containing a random access memory (hereinafter referred to as RAM) for storing stitch pattern data and other data. An external memory 16 comprising a magnetic disk drive device contains multiple positioning data. The positioning data specifies the movement of the fabric holding means 6 and 7 relative to the needle 4 required to form a variety of stitch patterns for characters and diagrams. The external memory 16 is connected to the CPU 13 via an input/output (I/O) interface 17.

The keyboard 11 is also connected to the CPU 13 via the I/O interface 17. When several stitch patterns are selected by keys on the keyboard 11, the CPU 13 reads out stitch pattern data corresponding to the selected stitch patterns from the external memory 16 and stores the stitch pattern data in the work memory 15. Subsequently, a repeating mode is set and a direction and numbers of an arranged combination of the stitch patterns are input by the key operation. The CPU 13 calculates displacement amounts, namely, margin spaces, of the fabric between neighboring stitch patterns and stores the amounts in the work memory 15, as shown in FIG. 3. The CPU 13 thus controls the stitch formation device 5, the feed device 8, and the display unit 12 in accordance with the data in the work memory 15 and the program in the program memory 14.

In case of thread breakage, needle breakage, or the like, a signal generator 18 generates a cessation signal for suspending the operation of the sewing machine and sends the cessation signal to the CPU 13 via the I/O interface 17.

Figure 6:
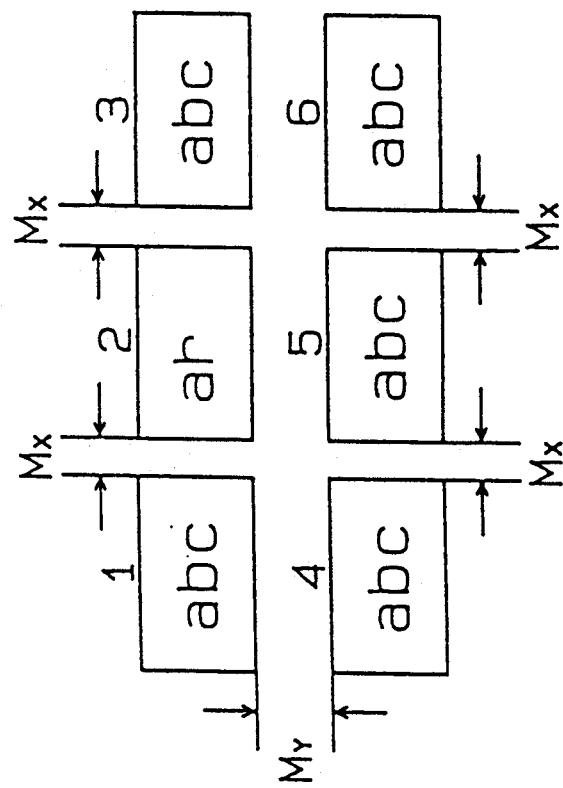
FIG. 6 illustrates several combinations of stitch patterns formed on a fabric including an uncompleted combination.

Now, the formation of combinations of stitch patterns by the sewing machine with the above construction will be described. The description is given of a combination "abc" consisting of stitch patterns "a","b", and "c", whose arrangement is shown in FIG. 6.

Figure 4B:
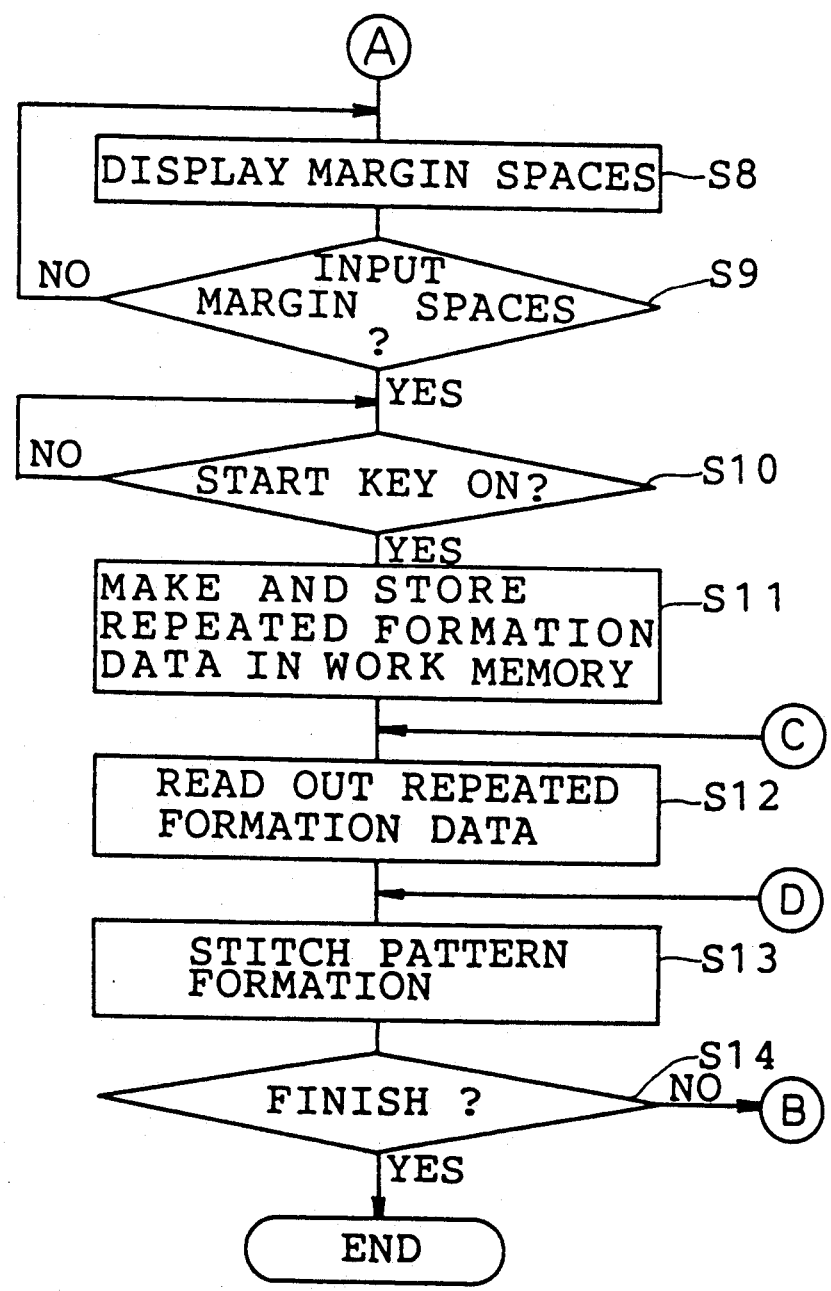
Figure 4C:
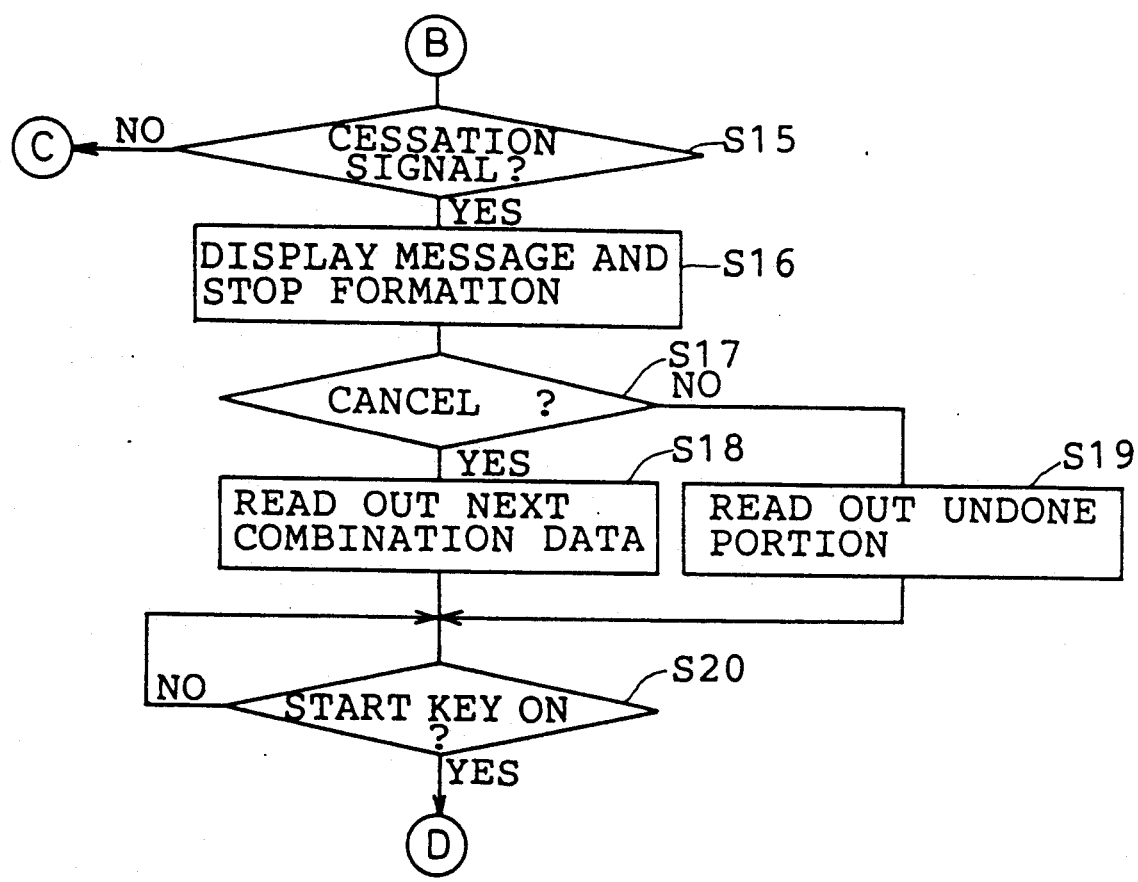

As shown in FIG. 4A, stitch patterns "a", "b", and "c" are chosen by an operation using the keys on the keyboard 11 at step S1. At step S2, the CPU 13 reads out the corresponding stitch pattern data from the external memory 16 and stores in the work memory 15 the stitch pattern data as a combination "abc", which will be repeatedly formed.

Figures 5A, 5B, 5C:
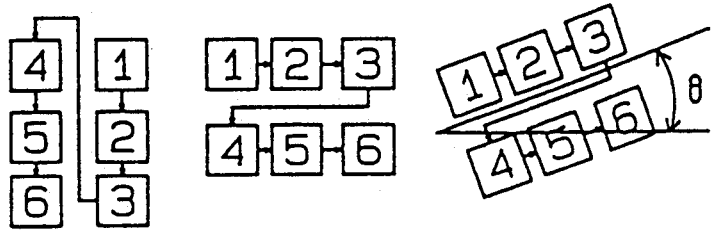
FIGS. 5A through 5C illustrates display screens of a display unit.

After a repeating mode is set by a specified key on the keyboard 11 at step S3, the CPU 13 displays choices of arrangement directions on the screen of the display unit 12 at step S4 and asks which arrangement direction is to be chosen at step S5, as shown in FIG. 5A. When "1. VERTICAL ARRANGEMENT" or "2. LATERAL ARRANGEMENT" is chosen by the pressing of a respective key, the CPU 13 stores data for the chosen arrangement direction in the work memory 15. When "3. OBLIQUE ARRANGEMENT" is chosen, a desired inclination $\theta$ must be input in the work memory 15 by certain keys.

At step S6 the CPU 13 further displays screens for arrangement numbers of the combinations to be repeated as shown in FIG. 5B. The numbers of the combination in the X-direction and the Y-direction are input at S7, for example, "3 X 2" as shown in FIG. 5B. Then, the numbers in the X-direction and the Y-direction are stored in the work memory 15, and the numbers and a total number of combinations to be arranged are displayed on the display unit 12.

Subsequently, at step S8 the CPU 13 displays a margin input screen on the display unit 12 as shown in FIG. 5C and asks an operator to set a lateral margin space Mx and a vertical margin space My between the neighboring combinations. Units shown on the screen are in millimeters. The chosen lateral margin space Mx and the vertical margin space My, for example, "010" and "020", are stored in the work memory 15 at step S9.

At step S10, a start key instructs the starting of the stitch pattern formation. According to the stitch pattern data and the arrangement data about the direction and the numbers, the CPU 13 generates relative position data, shown in FIG. 3, of the needle 4 and the fabric W so as to form the arranged combinations of the stitch patterns shown in FIG. 6. The CPU 13 stores the relative position data in the work memory 15 as repeated stitch pattern formation data shown in FIG. 4B at S11. The repeated stitch pattern formation data is composed of relative position data for each of the combinations of the stitch patterns to be repeated and a displacement data for the distances between the neighboring stitch patterns in which the fabric W is moved.

The CPU 13 then consecutively reads out the repeated stitch pattern formation data from the work memory 15 at S12, and drives the stitch formation device 5 and the feed device 8 to successively form the combinations of the stitch patterns "abc" in the order designated by the numbers in FIG. 6 according to the readout repeated stitch pattern formation data at step S13. The CPU 13 finishes the stitch pattern formation when the answer is YES at step S14.

When some accident including a thread breakage and a needle breakage happens during the formation of the stitch patterns, for example, during the formation of "b" in the second combination, the signal generator 18 issues a cessation signal to the CPU 13 at step S15. Then the CPU 13 displays a stitch cessation message on the display unit 12 in response to the cessation signal at S16 and suspends the sewing machine and asks whether the formation of "b" is canceled by the cancel key at S17. While the stitch cessation message is on the screen, the operator can find and remove the cause of the accident. When the cancel key is pushed to stop the formation of the second combination including the uncompleted stitch pattern "b", the CPU 13 reads out the stitch pattern data for the third combination to be formed next at S18. On the contrary, when a key for recommencing the formation of uncompleted stitch pattern "b" is pushed instead of the cancel key, the CPU 13 reads out a not-formed portion of the second combination of the stitch patterns at S19.

After either step S18 or step S19, by pushing the start key the sewing machine starts stitch pattern formation of the second combination or the third combination according to the stitch pattern data for the second combination or the third combination, respectively, at step S20. The steps S12 through S15 are repeated until all the chosen combinations of the stitch patterns are formed.

In the present invention described above, when the stitch pattern formation is forced to be suspended due to some accident such as thread breakage or needle breakage during the formation of the combination of stitch patterns "abc", the causes of the accident are removed and then the next combination of stitch patterns is formed. The half-done stitch pattern does not have to be formed again and the sewing machine starts easily and unfailingly forming the selected combination of the stitch patterns. Consequently, the sewing machine produces a high operational effectivity especially when the same combination of stitch patterns are repeatedly formed.

It should be understood that the present invention is not limited to the above-described embodiment and that the following modifications and others are possible:

(a) To repeatedly form a single stitch pattern, such as "a" or to form several stitch patterns such as "a", "b" and "c" successively in the same way as mentioned above.

(b) To provide a key for generating a cessation signal on a keyboard, which an operator may push at any time during stitch pattern formation.

What is claimed is:

1. A stitch pattern formation sewing machine, comprising:
   memory means for storing a plurality of stitch pattern data representing stitch patterns;
   input means for entering arrangement data defining a spatial arrangement of stitch patterns;
   stitching means for successively forming stitch patterns on a fabric under control of stitch pattern data and arrangement data;
   signal generating means for generating a cessation signal during the operation of the sewing machine; and
   control means for controlling the stitching means to stop the formation of stitch patterns in response to the cessation signal and to recommence the formation of stitch patterns starting with a start point selected from the group consisting of a point of cessation and an initial point for a subsequent stitch pattern to be formed after an interrupted stitch pattern being formed when the signal generating means generates the cessation signal.

2. The stitch pattern formation sewing machine of claim 1, in which the control means controls the stitching means to recommence the formation of stitch patterns by forming the subsequent stitch pattern at said start point, dictated by the stitch pattern data and arrangement data, where the subsequent stitch pattern would have been formed had the interrupted stitch pattern been completely formed.

3. The stitch pattern formation sewing machine of claim 1, further comprising:
   selecting means for selecting stitch pattern arrangements comprising a plurality of stitch patterns arranged in a predefined spatial relationship, where each stitch pattern selected to form the stitch pattern arrangements corresponds to a stitch pattern data stored in the memory means; wherein
   the subsequent stitch pattern is a first stitch pattern of a next stitch pattern arrangement to be formed after the stitch pattern arrangement containing the interrupted stitch pattern.

4. The stitch pattern formation sewing machine of claim 3, in which the arrangement data defines spatial orientation of stitch patterns by defining the distance from any stitch pattern arrangement to any adjacent stitch pattern arrangements.

5. The stitch pattern formation sewing machine of claim 3, in which the stitch pattern arrangements are formed in rows and/or columns and the arrangement data defines spatial orientation of stitch patterns by defining an angle $\theta$ between a line through the rows or columns of stitch pattern arrangements and a horizontal line.

6. The stitch pattern formation sewing machine of claim 1, in which the signal generating means generates the cessation signal when a sewing needle breaks, a sewing thread breaks, or an operator presses a halt button.

7. A stitch pattern formation sewing machine, comprising:
   memory means for storing a plurality of stitch pattern data representing stitch patterns;
   input means for entering arrangement data defining a spatial arrangement of stitch patterns;
   mode setting means for setting a repeating mode;
   input means for entering arrangement data defining a spatial relation of stitch patterns formed in the repeating mode;
   stitching means for forming stitch patterns on a fabric under control of stitch pattern data, where, when the repeating mode is set, the stitching means repeatedly forms stitch patterns having a spatial arrangement defined by the arrangement data;
   signal generating means for generating a cessation signal during the operation of the sewing machine; and
   control means for controlling the stitching means to stop the repeated formation of stitch patterns in repeating mode in response to the cessation signal and to recommence the formation of stitch patterns in repeating mode starting with a start point selected from the group consisting of a point of cessation and an initial point for a subsequent stitch pattern to be formed after an interrupted stitch pattern being formed when the signal generating means generates the cessation signal.

8. The stitch pattern formation sewing machine of claim 7, in which the control means controls the stitching means to recommence the repeated formation of stitch patterns by forming the subsequent stitch pattern at said start point, dictated by the stitch pattern data and arrangement data, where the subsequent stitch pattern would have been formed had the interrupted stitch pattern been completely formed.

9. The stitch pattern formation sewing machine of claim 7, further comprising:

selecting means for selecting stitch pattern arrangements comprising a plurality of stitch patterns arranged in a predefined spatial relationship, where each stitch pattern selected to form the stitch pattern arrangements corresponds to a stitch pattern data stored in the memory means; wherein the subsequent stitch pattern is a first stitch pattern of a next stitch pattern arrangement to be formed after the stitch pattern arrangement containing the interrupted stitch pattern.

10. The stitch pattern formation sewing machine of claim 9, in which the arrangement data defines spatial orientation of stitch patterns by defining the distance from any stitch pattern arrangement to any adjacent stitch pattern arrangements.

11. The stitch pattern formation sewing machine of claim 9, in which the stitch pattern arrangements are formed in rows and/or columns and the arrangement data defines spatial orientation of stitch patterns by defining an angle $\theta$ between a line through the rows or columns of stitch pattern arrangements and a horizontal line.

12. The stitch pattern formation sewing machine of claim 7, in which the signal generating means generates the cessation signal when a sewing needle breaks, a sewing thread breaks, or an operator presses a halt button.

13. A stitch pattern formation sewing machine, comprising:

pattern data memory means for storing a plurality of sets of stitch pattern data where each set of stitch pattern data defines the movement of a fabric in two directions with respect to a sewing needle for forming a stitch pattern on a cloth;

selecting means for selecting stitch patterns to form a stitch pattern arrangement where each stitch pattern selected to form the stitch pattern arrangement corresponds to a set of stitch pattern data stored in the memory means;

input means for entering arrangement data corresponding to a group of stitch patterns comprising at least one stitch pattern arrangement where the arrangement data defines the number and spatial orientation of the stitch pattern arrangements within the group;

stitching means for controlling the needle and movement of the fabric to form the group of stitch patterns on the fabric under control of the selected stitch pattern data in the stitch pattern arrangement and the arrangement data;

signal generating means for generating a cessation signal during the operation of the sewing machine; and control means for controlling the stitching means to stop the formation of the group of stitch patterns in response to the cessation signal and to recommence the formation of the group of stitch patterns starting with a start point selected from the group consisting of a point of cessation and a first stitch pattern of a next stitch pattern arrangement to be formed after the stitch pattern arrangement containing an interrupted stitch pattern being formed when the signal generating means generates the cessation signal.

14. The stitch pattern formation sewing machine of claim 13, in which the control means controls the stitching means to recommence the repeated formation of stitch patterns by forming the first stitch pattern of the next stitch pattern arrangement at said start point, dictated by the stitch pattern data and arrangement data, where the first stitch pattern of the next stitch pattern arrangement would have been formed had the stitch pattern arrangement containing the interrupted stitch pattern been completely formed.

15. The stitch pattern formation sewing machine of claim 13, in which the arrangement data define the spatial orientation of stitch pattern arrangements by defining the distance from any stitch pattern arrangement to any adjacent stitch pattern arrangements.

16. The stitch pattern formation sewing machine of claim 14, in which the stitch pattern arrangements are spaced in rows and/or columns and the arrangement data defines spatial orientation of stitch pattern arrangements by defining an angle $\theta$ between a line drawn through a row or column and a horizontal line.

17. The stitch pattern formation sewing machine of claim 14, in which the signal generating means generates the cessation signal when the sewing needle breaks, a sewing thread breaks, or an operator presses a halt button.

18. A stitch pattern formation sewing machine for forming stitch patterns on a fabric, comprising:

stitch pattern memory means for storing a plurality of stitch pattern data representing a variety of different stitch patterns;

first selecting means for selecting data for a desired stitch pattern from the plurality of stitch pattern data stored in the stitch pattern memory means;

arrangement memory means for storing a plurality of arrangement data for representing arrangements of stitch patterns to be formed on the fabric;

second selecting means for selecting a desired set of arrangement data from the plurality of arrangement data stored in the arrangement memory means;

repeating number setting means for setting a repeating number representing the number of times that the desired stitch pattern is formed;

stitching means for forming stitch patterns on the fabric;

control means for controlling the stitching means to form a plurality of stitch patterns on the fabric repeatedly according to the data for the desired stitch pattern, the desired set of arrangement data, and the repeating number;

signal generating means for generating a cessation signal during the operation of the sewing machine; and selection means for designating a start point when sewing is recommenced, wherein the control means further controls the stitching means to stop the formation of stitch patterns in response to the cessation signal and to recommence the formation of stitch patterns starting with a start point selected from the group consisting of a point of cessation and an initial point for a subsequent stitch pattern to be formed after interruption of a stitch pattern being formed when the signal generating means generates the cessation signal.

19. The stitch pattern formation sewing machine of claim 18, in which the desired set of arrangement data comprises direction data and margin space date.

20. The stitch pattern formation sewing machine of claim 18, in which the control means controls the stitching means to recommence the repeated formation of stitch patterns by forming the subsequent stitch pattern at said start point, dictated by the stitch pattern data and arrangement data, where the subsequent stitch pattern would have been formed had the interrupted stitch pattern been formed.

21. The stitch pattern formation sewing machine of claim 20 in which the signal generating means generates the cessation signal when the sewing needle breaks, a sewing thread breaks, or an operator presses a halt button.

22. The stitch pattern formation sewing machine of claim 21, further comprising:
holding means for holding the fabric; wherein
the stitching means forms stitches on the fabric by reciprocating a needle and by moving the fabric holding means relative to the needle.

* * * * *